US009806899B2

(12) United States Patent
So et al.

(10) Patent No.: US 9,806,899 B2
(45) Date of Patent: *Oct. 31, 2017

(54) APPARATUS AND METHOD FOR CONTROLLING REMOTE USER INTERFACE SERVERS USING A MULTICAST MESSAGE IN A HOME NETWORK

(71) Applicant: Samsung Electronics Co., Ltd., Gyeonggi-do (KR)

(72) Inventors: Young-Wan So, Seoul (KR); Young-Sun Ryu, Gyeonggi-do (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 280 days.

This patent is subject to a terminal disclaimer.

(21) Appl. No.: 14/527,343

(22) Filed: Oct. 29, 2014

(65) Prior Publication Data
US 2015/0058408 A1 Feb. 26, 2015

Related U.S. Application Data

(63) Continuation of application No. 13/185,097, filed on Jul. 18, 2011, now Pat. No. 8,930,444.

(30) Foreign Application Priority Data

Jul. 16, 2010 (KR) .................. 10-2010-0069231

(51) Int. Cl.
*H04L 12/28* (2006.01)
*H04L 29/08* (2006.01)
*H04L 29/06* (2006.01)

(52) U.S. Cl.
CPC ........ *H04L 12/281* (2013.01); *H04L 12/2803* (2013.01); *H04L 12/2816* (2013.01);
(Continued)

(58) Field of Classification Search
CPC .............. H04L 12/2803; H04L 12/281; H04L 12/2816; H04L 12/2818; H04L 12/2838; H04L 67/02; H04L 67/42
(Continued)

(56) References Cited

U.S. PATENT DOCUMENTS

| 5,657,221 | A | 8/1997 | Warman et al. |
| 5,790,530 | A * | 8/1998 | Moh ............... G06F 13/128 |
| | | | 370/363 |

(Continued)

FOREIGN PATENT DOCUMENTS

| JP | 10-508711 | 8/1998 |
| JP | 2004-336105 | 11/2004 |

(Continued)

OTHER PUBLICATIONS

CEA-2027A—A User Interface Specification for Home Networks Using Web-based Protocols ANSI/CEA-2027-A, CEA, Jul. 2006.*
(Continued)

*Primary Examiner* — David Lazaro
*Assistant Examiner* — Robert Shaw
(74) *Attorney, Agent, or Firm* — The Farrell Law Firm, P.C.

(57) ABSTRACT

An apparatus and method for controlling a Remote User Interface Server (RUIS) in a Remote User Interface Client (RUIC), wherein the method includes rendering an RUI page for controlling RUISs, receiving an input of a control command for controlling the RUISs from a user through the RUI page, generating a multicast control message for transmitting the input control command in a form of multicast, and transmitting the multicast control message to the RUISs.

18 Claims, 8 Drawing Sheets

(52) U.S. Cl.
CPC ...... *H04L 12/2818* (2013.01); *H04L 12/2823* (2013.01); *H04L 12/2838* (2013.01); *H04L 67/02* (2013.01); *H04L 67/025* (2013.01); *H04L 67/125* (2013.01); *H04L 67/42* (2013.01)

(58) Field of Classification Search
USPC ....................................................... 709/203
See application file for complete search history.

(56) References Cited

U.S. PATENT DOCUMENTS

| | | | |
|---|---|---|---|
| 6,243,707 B1 | 6/2001 | Humpleman et al. | |
| 7,441,019 B2* | 10/2008 | Zintel | H04L 12/2803 709/220 |
| 8,214,534 B2* | 7/2012 | Maeng et al. | 709/249 |
| 8,266,666 B2* | 9/2012 | Friedman | 725/133 |
| 2002/0112058 A1* | 8/2002 | Weisman et al. | 709/227 |
| 2003/0037177 A1* | 2/2003 | Sutton | H04L 41/024 719/316 |
| 2003/0065824 A1* | 4/2003 | Kudo | 709/250 |
| 2003/0117433 A1* | 6/2003 | Milton et al. | 345/738 |
| 2004/0138768 A1* | 7/2004 | Murray | G09B 25/00 700/90 |
| 2004/0205172 A1 | 10/2004 | Kim | |
| 2004/0205339 A1* | 10/2004 | Medin | 713/163 |
| 2004/0208159 A1 | 10/2004 | Jung et al. | |
| 2005/0267935 A1* | 12/2005 | Gandhi et al. | 709/203 |
| 2005/0267972 A1* | 12/2005 | Costa-Requena et al. | 709/227 |
| 2006/0036672 A1* | 2/2006 | Cha | H04L 29/06027 709/202 |
| 2006/0037036 A1* | 2/2006 | Min et al. | 725/1 |
| 2006/0125632 A1* | 6/2006 | Luebke | H04L 12/2803 340/539.26 |
| 2007/0136768 A1* | 6/2007 | Kumar | H04N 21/4223 725/81 |
| 2007/0150616 A1* | 6/2007 | Baek | H04L 12/2803 709/246 |
| 2007/0176820 A1* | 8/2007 | Vidal | G08C 17/02 341/176 |
| 2007/0226311 A1* | 9/2007 | Kaarela et al. | 709/217 |
| 2008/0045149 A1 | 2/2008 | Dharmaraju et al. | |
| 2008/0120422 A1* | 5/2008 | Park et al. | 709/229 |
| 2008/0177822 A1* | 7/2008 | Yoneda | H04L 12/282 709/202 |
| 2008/0243998 A1* | 10/2008 | Oh et al. | 709/203 |
| 2009/0031035 A1* | 1/2009 | Dharmaraju et al. | 709/230 |
| 2009/0052899 A1* | 2/2009 | Mok | G08C 17/02 398/106 |
| 2009/0100492 A1* | 4/2009 | Hicks et al. | 725/127 |
| 2009/0103456 A1* | 4/2009 | Herrmann et al. | 370/254 |
| 2009/0125628 A1* | 5/2009 | Dahlen | 709/227 |
| 2009/0172757 A1* | 7/2009 | Aldrey et al. | 725/110 |
| 2009/0175296 A1* | 7/2009 | P | H04L 12/2832 370/466 |
| 2009/0193438 A1 | 7/2009 | Jin et al. | |
| 2009/0210488 A1 | 8/2009 | Lee | |
| 2009/0235277 A1* | 9/2009 | Liu | 719/313 |
| 2009/0245267 A1* | 10/2009 | Igarashi et al. | 370/401 |
| 2009/0265645 A1 | 10/2009 | Park et al. | |
| 2010/0011099 A1* | 1/2010 | Chintada et al. | 709/224 |
| 2010/0037300 A1 | 2/2010 | Jin et al. | |
| 2010/0095332 A1* | 4/2010 | Gran et al. | 725/93 |
| 2010/0131633 A1* | 5/2010 | Herlein | H04L 67/025 709/223 |
| 2010/0299438 A1* | 11/2010 | Zimmerman | H04N 7/17318 709/226 |
| 2011/0049751 A1 | 3/2011 | Gada et al. | |
| 2011/0102135 A1* | 5/2011 | Ramsdell | 340/5.8 |
| 2011/0107379 A1* | 5/2011 | Lajoie et al. | 725/87 |
| 2011/0119346 A1* | 5/2011 | Kim et al. | 709/217 |
| 2011/0289545 A1* | 11/2011 | Eguchi | H04N 21/43637 725/127 |

FOREIGN PATENT DOCUMENTS

| | | |
|---|---|---|
| KR | 102004003903 A | 5/2004 |
| KR | 1020040074713 | 8/2004 |
| KR | 1020040090224 | 10/2004 |
| KR | 1020010019894 A | 3/2011 |
| WO | WO 2009/088437 | 7/2009 |
| WO | WO 2010/062064 | 6/2010 |

OTHER PUBLICATIONS

AV/C Digital Interface Command Set General Specification Version 4.2, Doc. No. 2004006, 1394 Trade Association, Sep. 1, 2004.*
Tsang et al, SIP Extensions for Communicating with Networked Appliances, IETF, Nov. 2000 (draft-tsang-sip-appliances-do-00.txt).*
Zimmerman et al, Universal Control Hub & Task-Based User Interfaces, URC Consortium, Jan. 2006.*
URC Universal remote console Part 1: Framework, ISO/IED FDIS 24752-1 (2007).*
UPnP Device Architecture Version 1.1, UPnP Forum, (Oct. 15, 2008).*
Web-based Protocol and Framework for Remote User Interface on UPnP™ Networks and the Internet (Web4CE), CEA-2014-A, CEA, Jul. 2007.*
UPnP Device Architecture Version 1.1 , UPnP Forum, (Oct. 15, 2008).*
Khurana et al, Device Message Protocol (DMP): An XML based format for Wide Area Communication with Networked Appliances, IETF, Nov. 2000 (draft-khurana-dmp-appliances-00.txt).*
C. Reinisch, Wireless Communication in Home and Building Automation, Thesis—Vienna Universiity of Technolody, Feb. 13, 2007.*
Korean Office Action dated Oct. 15, 2016 issued in counterpart application No. 10-2010-0069231, 6 pages.

* cited by examiner

APPARATUS AND METHOD FOR CONTROLLING REMOTE USER INTERFACE SERVERS USING A MULTICAST MESSAGE IN A HOME NETWORK

PRIORITY

This application is a continuation application of U.S. application Ser. No. 13/185,097 filed in the U.S. Patent and Trademark Office on Jul. 18, 2011, and claims priority under 35 U.S.C. §119(a) to a Korean Patent Application filed in the Korean Industrial Property Office on Jul. 16, 2010 and assigned Serial No. 10-2010-0069231, the entire content of which is incorporated herein by reference.

BACKGROUND OF THE INVENTION

1. Field of the Invention

The present invention relates generally to Internet Protocol (IP)-based home networking, and more particularly, to a method and an apparatus in which a Remote User Interface Client (RUIC) controls a plurality of RUI Servers (RUIS).

2. Description of the Related Art

In general, home networking is configured by an IP based private network and connects different devices, e.g., all types of Personal Computers (PCs), intelligent products used within the home, and various other devices, such as wireless apparatuses, to one network through a common virtual computing environment, which is commonly referred to as "middleware", to control the devices.

Middleware connects the various devices in a peer-to-peer manner to enable communication between the devices. Middleware has been actively researched, and up to now, proposed in order to improve the home network technique by many industry standard organizations such as Digital Living Network Alliance (DLNA), an Home Audio Video Interoperability (HAVI), Universal Plug and Play (UPnP), Java Intelligent Network Infrastructure (Jini), Home Wide Web (HWW), etc.

In the home network, an RUI technique can be used by one device to control functions of other devices. The RUI technique is based on a client-server architecture and is used by a user can control the RUIS through the UI in the RUIC, after the RUIC obtains the UI from the RUTS.

Such an RUI technique is a mechanism, which renders and controls a user interface for controlling an application on another device, instead of a device driving the corresponding application. Currently, there are a number of various RUI techniques being researched, such as Consumer Electronics Association (CEA)-2014, eXpandable Home Theater (XHT), Widget Description Exchange Service (Wi-DeX), Remote Desktop Protocol (RDP), etc.

A remote control system included in the CEA-2014 technique includes an RUIS providing a UI for remote control and an RUIC indicating the UI sent from the RUIS.

The RUTS providing the UI for the remote control has a web server in the RUIS. The RUIS transmits a web page, which the RUIC requires, through the web server and the RUIC displays the web page of a corresponding UI to the user through an eXtensible HyperText Markup Language (XHTML) browser.

By using such an RUI technique, the RUIC sets up the RUIS and a session and can control the RUIS by receiving UI components from the RUIS. Here, the UI components refer to elements included in the UI and have a concept, which is a general term for all types of data provided to the RUIC from the RUIS, such as an icon, a pull-down menu, a button, a scroll bar, a window, a text, and A/V data (audio/video, picture, etc.) on the session.

FIG. 1 illustrates a conventional RUIC device controlling a plurality of RUISs using a remote UI page and control information provided by conventional RUISs.

Referring to FIG. 1, when an RUIC 100 device is to control a plurality of RUISs 101 to 103, the RUIC 100 device sequentially selects the RUIS 101-103 devices, one by one. Also, when there are several control commands, which will be sent to one device, each control message is sequentially sent to the device to be controlled.

For example, in order to enable a user of the RUIC 100 to control the RUISs 101 to 103, the RUIC 100 sequentially transmits control commands 104 to 108 to each of the RUIS devices 101 to 103. When the user of the RUIC 100 desires to turn down the volumes of RUIS #1 101, RUIS #2 102, and RUIS #3 103, the user of the RUIC 100 transmits each of the Volume Down control commands 104, 106, and 107. Subsequently, when the user of the RUIC 100 desires to power off RUIS #1 101 when it enters into a sleep mode, the user of the RUIC 100 transmits the control command 105 to RUIS #1 101. When the user of the RUIC 100 desires to turn the light of RUIS #3 103 off, the user of the RUIC 100 transmits the control command 108 to RUIS #3 103.

In FIG. 1, the user selects devices one by one and repeats a process in which the user loads the UI page from the RUIS to be controlled, each time the user controls the RUIS device. Also, when there are several operations to be controlled, a message including the control command should be sequentially transmitted to the RUIS several times. However, in this case, a user repeatedly performs cumbersome procedures and selections, which deteriorates control efficiency.

SUMMARY OF THE INVENTION

Accordingly, the present invention has been designed to solve the above-mentioned problems occurring in the prior art, and the present invention provides at least the advantages described below.

An aspect of the present invention is to provide a method and an apparatus in which a user of an RUIC efficiently controls a plurality of RUISs by using a multicast message.

Another aspect of the present invention is to provide a method and an apparatus in which an RUIC transmits control commands for controlling adjacent RUISs in a multicast manner.

In accordance with an aspect of the present invention, a method for controlling an RUIS in an RUIC is provided. The method includes: rendering an RUI page for controlling RUISs; receiving an input of a control command for controlling the RUISs from a user through the RUI page; generating a multicast control message for transmitting the input control command in a multicast manner; and transmitting the multicast control message to the RUISs.

In accordance with another aspect of the present invention, an RUIC apparatus is provided for controlling an RUIS. The RUIC apparatus includes a browser for rendering an RUI page for controlling RUISs and receiving an input of a control command for controlling the RUISs from a user through the RUI page; a control command processor for generating a multicast control message for transmitting the control command to the RUISs in a multicast manner; and a multicast message handler for transmitting the multicast control message to the RUISs.

In accordance with another aspect of the present invention, a method is provided for an RUIS to receive a control command from an RUIC. The method includes receiving a multicast message from an RUIC; identifying whether the received multicast message is a multicast control message; when the received multicast message is the multicast control message, identifying whether there is a service to be controlled according to a control command included in the multicast control message; when there is the service to be controlled according to the control command, identifying whether a resource for the service can be controlled; and when the resource can be controlled, performing an operation corresponding to the control command.

In accordance with another aspect of the present invention, an RUIS apparatus is provided for receiving a control command from an RUIC, the RUIS apparatus includes a multicast message handler for receiving a multicast message from an RUIC; and a control command reception processor for identifying whether the received multicast message is a multicast control message, identifying whether there is a service to be controlled according to a control command included in the multicast control message when the received multicast message is the multicast control message, identifying whether a resource for the service can be controlled when there is the service to be controlled according to the control command, and processing the performance of the control command when the resource can be controlled.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Figure 1:
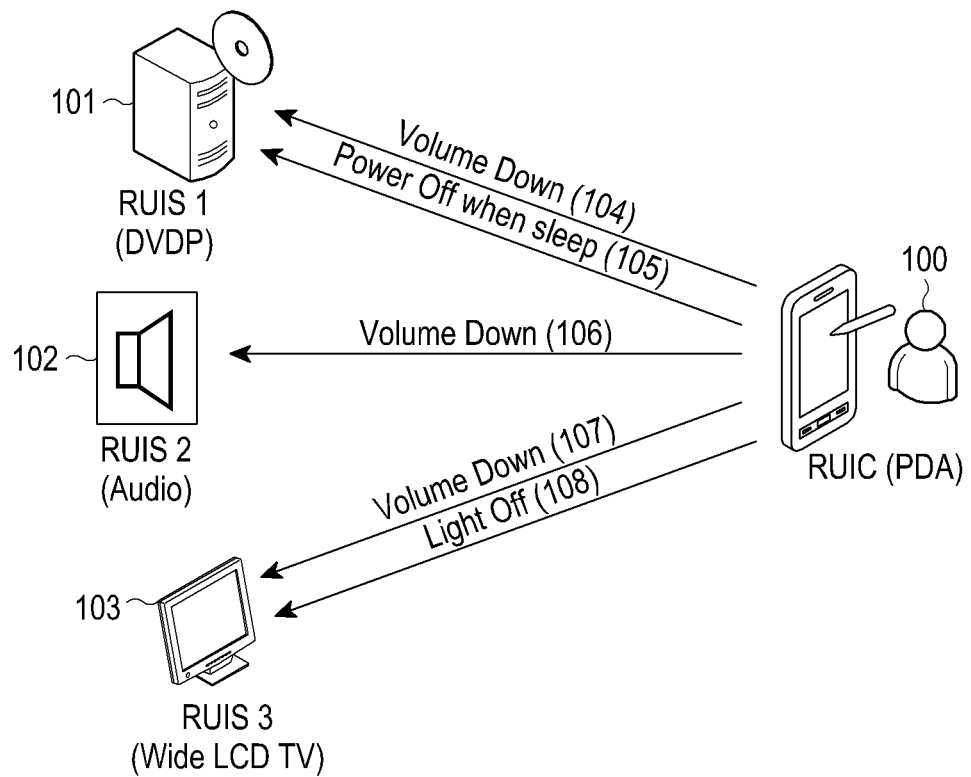
FIG. 1 illustrates a conventional RUIC device controlling a plurality of RUISs using a remote UI page and control information provided by conventional RUISs.

Various embodiments of the present invention will be described in detail hereinafter with reference to the accompanying drawings. However, the present invention is not limited to these embodiments but may be implemented in different forms. These embodiments are provided only for illustrative purposes and for full understanding of the scope of the present invention by those skilled in the art. Additionally, throughout the drawings, like reference numerals indicate like elements.

Figure 2:
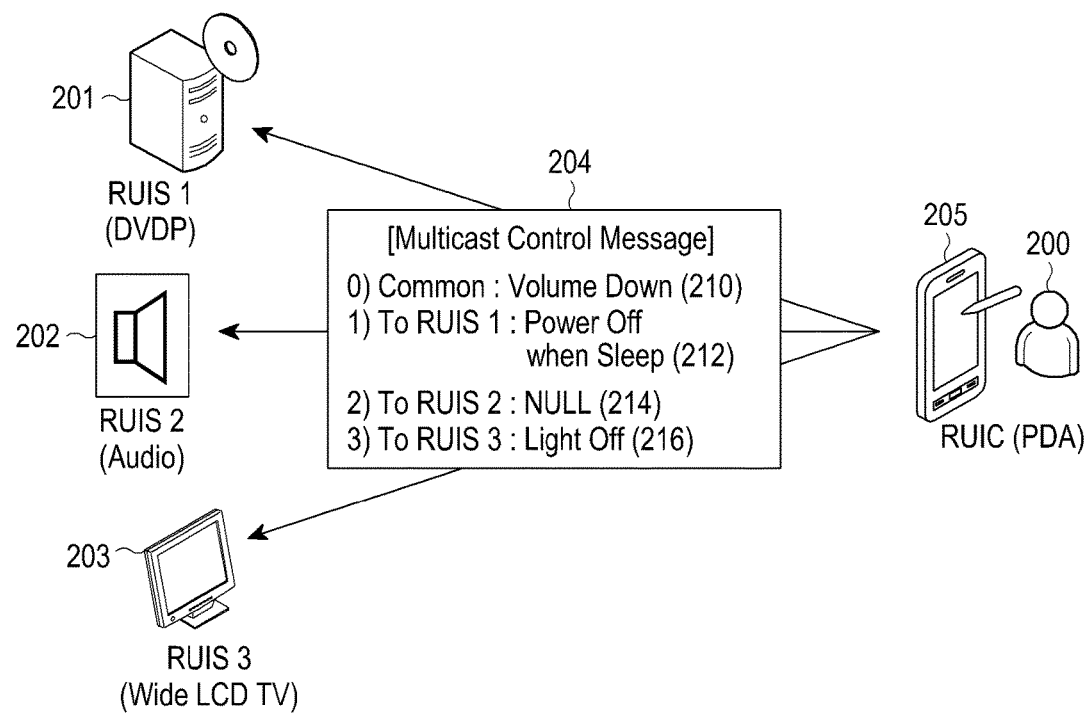
FIG. 2 illustrates an RUIC control device transmitting a multicast control message including a control command to adjacent RUISs according to an embodiment of the present invention.

FIG. 2 illustrates an RUIC control device transmitting a multicast control message including a control command to adjacent RUISs, according to an embodiment of the present invention.

Referring to FIG. 2, RUISs 201, 202, and 203 are various kinds of controlled devices (e.g., a DVD Player (DVDP), an Audio system, and a Liquid Crystal Display (LCD) Television (TV)) and each of the RUISs 201, 202, and 203 receives a multicast control message 204 including a control command designated by a user 200 of an RUIC 205, from the RUIC 205.

The control commands designated by the user 200 include, for example, a control command for turning down the volume. As described above, in the conventional art, the user 200 of the RUIC 205 selects the adjacent DVDP 201, the audio device 202, and the LCD TV 203, which are in an On-state, one at a time, and then transmits a volume down command to each device. However, in accordance with an embodiment of the present invention, the RUIC 205 transmits a control command to all of the RUISs 201-203, at one time, using a multicast message.

More specifically, according to an embodiment of the present invention, FIG. 2 illustrates that the user 200 of the RUIC transmits a multicast control message 204, which includes a control command 210 for commonly controlling the RUISs 201-203 to reduce their volume. Further, the multicast control message 204 also includes a control command 212 for the RUIS #1 201 to turns off its power when in a sleep mode, a control command 214 for informing the RUIS #2 202 that there is no additional control command to control, and a control command 216 for controlling the RUIS #3 203 to turns off its light.

Accordingly, the RUISs #1 to #3 201 to 203 receive the multicast control message 204 from the RUIC 205, and each reduce their volume according to control command 210. Further, the RUIS #1 201 turns off its power when entering into a sleep mode according to control command 212, the RUIS #3 203 turns off its light according to the control command 216, and the RUIS #2 202 identifies that there is no control command to be added to RUIS #2 202 because the control command corresponding to RUIS #2 202 is set to "NULL" 214 in the multicast control message 204.

Figure 3:
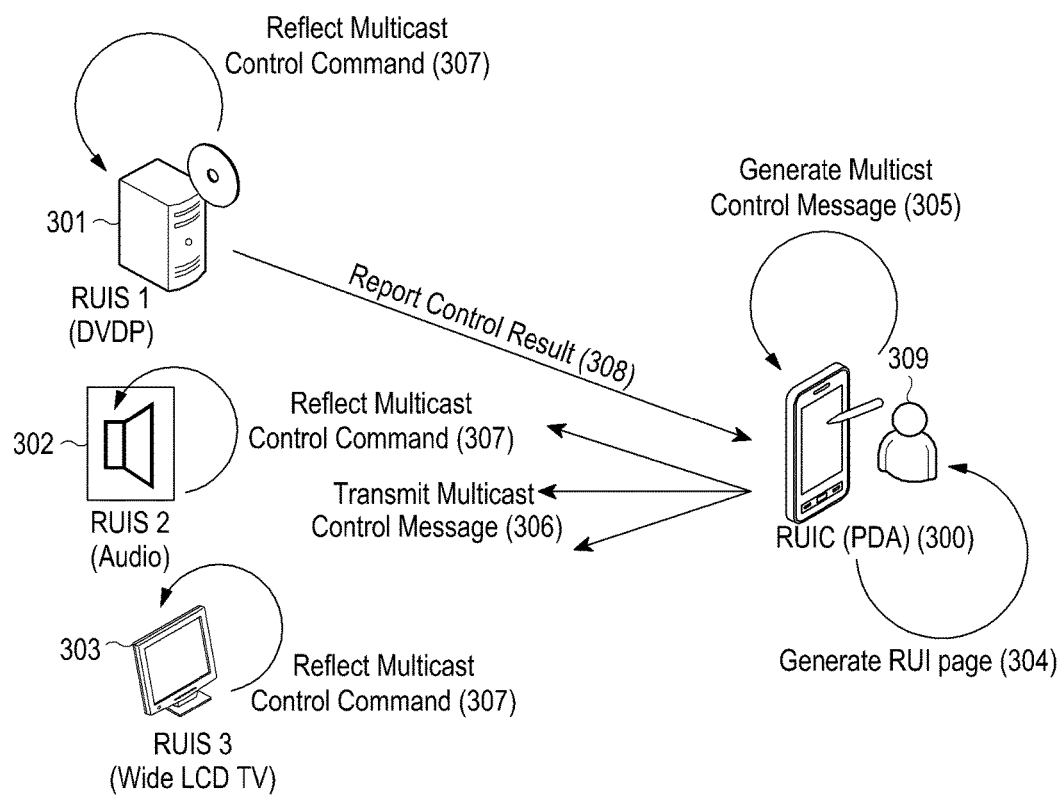
FIG. 3 illustrates procedures for transmitting a multicast control message including a control message for controlling a plurality of RUISs by an RUIC in a home network environment according to an embodiment of the present invention.

FIG. 3 illustrates procedures for transmitting a multicast control message including control commands for controlling a plurality of RUISs by an RUIC in a home network environment according to an embodiment of the present invention.

Referring to FIG. 3, in step 304, an RUIC 300 device provides an RUI page for setting a set of control commands for controlling adjacent RUIS devices 301 to 303. The RUI page can be provided from information with regard to the RUISs 301 to 303, which are the controlled devices, and information with regard to the control commands for controlling the RUISs 301 to 303 by the RUIC 300.

The user 309 selects the set of the control commands to be transmitted to the adjacent RUISs 301 to 303 through the provided RUI page, and the RUIC 300 device configures selected the control commands to a multicast control message in step 305. In step 306, the set of the control commands included in the multicast control message is transmitted to the RUISs 301 to 303.

After receiving the multicast control message in step 306, in step 307, the RUISs 301, 302, and 303 parse and analyze the received multicast control message to determine whether the multicast control message is a message which is for control, whether the multicast control message is valid for the RUISs 301, 302, and 303, and whether the multicast control message is possible to be controlled, and then apply a result of the determination. In step 308, a result of the control according to the control command included in the multicast control message is transmitted to the RUIC 300.

Figure 4:
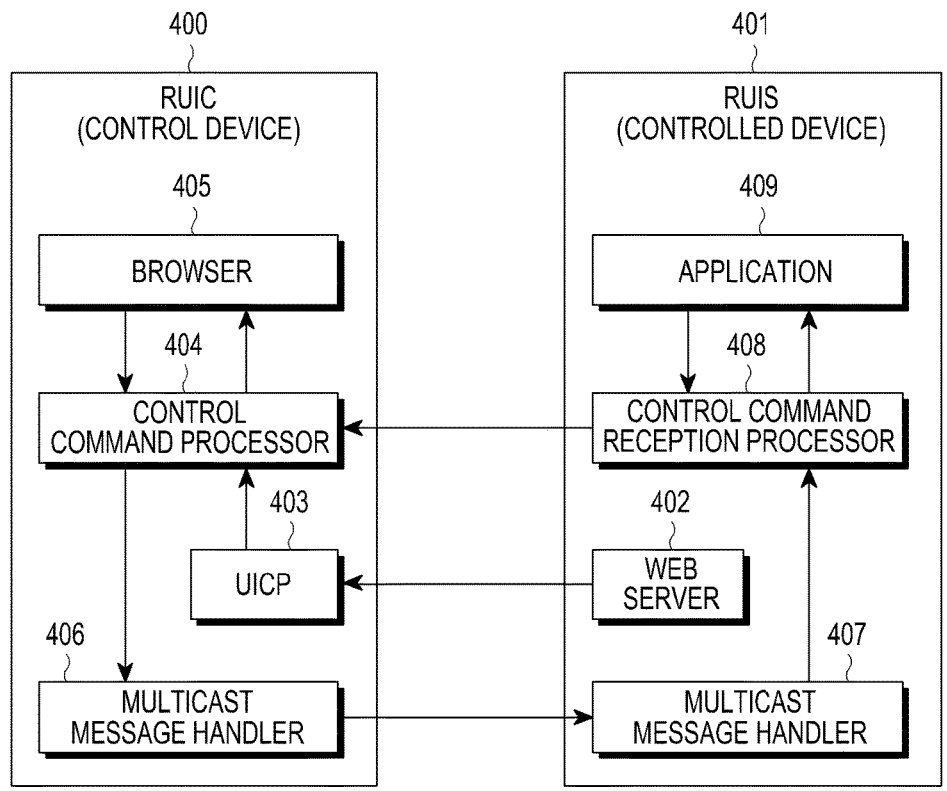
FIG. 4 is a block diagram illustrating an RUIC and an RUIS according to an embodiment of present.

FIG. 4 is a block diagram illustrating logical entities of an RUIC and an RUIS according to an embodiment of the present invention.

Referring to FIG. 4, an RUIC 400 includes a browser 405, a control command processor 404, a User Interface Control Point (UICP) 403, and a multicast message handler 406. An RUIS 401 includes an application 409, a control command reception processor 408, a web server 402, and a multicast message handler 407.

The web server 402 of the RUIS 401 provides the UICP 403 with information of the RUTS 401 and control command information, which is information about the control commands for controlling the controlled devices.

After receiving the control command information from the web server 403, the UICP 403 recognizes the presence of the RUIS 401, which is an adjacent device located adjacent to the UICP 403, collects information for controlling the RUISs from the RUIS 401, and transmits the collected information to the control command processor 404. The UICP 403 connects devices between the RUIC 400 and the RUIS 401.

The control command processor 404 generates a multicast control message to control the RUIS 401 using the information of the RUIS 401 and the information of the control commands, which are obtained from the UICP 403. Therefore, the control command processor 404 newly establishes the RUI page for controlling the RUIS 401 by using the information of the control commands, which are collected by the UICP 403, for controlling the RUIS 401 and then provides a browser 405 with the newly established RUI page, or provides the browser 405 with the RUI stored in advance.

There are two methods of providing the RUI page for the control command processor 404 to control the RUIS 401 according to an embodiment of the present invention.

In a first method, when the UICP 403 obtains the control information of the RUIS 401 from the web server 402, the control command processor 404 provides the new RUI page according to the obtained control information.

In a second method, the control command processor 404 provides the RUI page stored in a manufacturing process because standard protocols between the RUIC 400 and the RUIS 401 are identical.

Further, the control command processor 404 receives control result report information transmitted from the control command reception processor 408 and then processes the received control result report information. The browser 405 receives an input from the user to provide the user with a user interface in order to generate the control command for controlling the RUIS 401 and transmits the set of the control commands input by the user to the control command processor 404.

The control command processor 404 generates a multicast control message, which includes a service to be controlled by the set of the control commands transmitted from the browser 405 among services provided in the RUIS 401, the set and the order of the control commands, a Uniform Resource Location (URL) address to which the RUIS 401 should send a response to the result of control, information for reporting the RUIS to which the control command will be transmitted when necessary, and a flag for discriminating the multicast control message according to an embodiment of the present invention from a general multicast notification message.

The information for reporting the RUIS to which the control command will be transmitted may be included to instruct a specific RUIS to which each control command should be transmitted, where a part of the sets of the control commands are transmitted to RUIS #1 and another part of the sets of the control commands are transmitted to RUIS #2.

The multicast message handler 406 of the RUIC 400 multicasts the multicast control message, which is received from the control command processor 404, to adjacent RUIS 401. A multicast notification message is transmitted to the RUIC 400, from the RUIS 401, in general prior art, but the multicast notification message is transmitted in a reverse direction in accordance with an embodiment of the present invention. That is, the multicast notification message is transmitted from the RUIC 400 to the RUIS 401. Therefore, the multicast message handler 406 and the multicast message handler 407 can transmit and receive the multicast control message according to an embodiment of the present invention.

When the multicast message handler 407 receives the multicast control message from the RUIC 400, the multicast message handler 407 transfers the received multicast control message to the control command reception processor 408. The control command reception processor 408 parses the received multicast control message and determines whether the multicast control message is a command transmitted from the RUIC 400, which is the control device having a right to control the RUIS 401. As a result of the determination, when the multicast control message is the command transmitted from the RUIC 400, the control command reception processor 408 determines which service the command controls among the services provided by the control command reception processor 408 and whether the command can control a resource of the service to be controlled. Further, the control command reception processor 408 determines whether the command is an intended control command for controlling the control command reception processor 408 itself when necessary.

After receiving the multicast control message, the control command reception processor 408 determines whether the control command included in the received multicast control message is transmitted for controlling the RUIS 401 and whether the control command can be performed by the capability of the RUIS 401, although the control command is received for controlling the RUIS 401, so that the control command reception processor 408 can determine whether the control command is the intended control command for controlling the control command reception processor 408 itself.

As a result of the determination, when the received multicast control message includes the control command for controlling the control command reception processor 408, the control command reception processor 408 transfers the control command included in the multicast control message to an application 409 and the application 409 executes the control according to the control command. Further, the application 409 reports a result of the control to the control command reception processor 408 and the control command reception processor 408 reports a result of the processing for the control command to the control command processor 404, which terminates the multicast control operation. Accordingly, the control command processor 404 may have a small, embedded web server function or can perform a server-client function by using a web server function within each of the RUIC 400 and the RUIS 401.

Table 1 is a diagram of a multicast control message according to an embodiment of the present invention and is configured by eXtensible Markup Language (XML). In value="123.156.213.3"> indicates an IP address of the RUIC 3, <argumentName1>in arg value</argumentName1><argumentName2>in arg value</argumentName2> indicate that the number of control commands corresponding to RUIS #3 is two, and the control commands are inserted to each "in arg value". "D" indicates a URL address, to which the RUIS controlled by the RUIC transmits a response message.

TABLE 1

```
NOTIFY * HTTP/1.1
HOST: 239.255.255.246:7900
CONTENT-TYPE: text/xml; charset="utf-8"
USN:Unique Service Name for the publisher
SVCID: ServiceID from SCPD
NT: upnp:event
NTS: upnp:propchange
SEQ: monotonically increasing sequence count
LVL: event importance
Notification Type: Control
BOOTID.UPNP.ORG: number increased each time device sends an initial announce or
an update message
SOAPACTION: "urn:schemas-upnp-org:service:serviceType:v#actionName"
<?xml version="1.0"?>
<s:Envelope
xmlns:s="http://schemas.xmlsoap.org/soap/envelope/"
s:encodingStyle="http://schemas.xmlsoap.org/soap/encoding/">
    <s:Body>
        <Target value=" 123.156.213.1">                                                        ~A
            <u:actionName mlns:u="urn:schemas-upnp-org:service:serviceType:v">
                <argumentName1>in arg value</argumentName1>
            </u:actionName>
        </Target>

<Target value="123.156.213.2">
            <u:actionName mlns:u="urn:schemas-upnp-org:service:serviceType:v">
                <argumentName1>in arg value</argumentName1>
                <argumentName2>in arg value</argumentName2>                                    ~B
                <argumentName3>in arg value</argumentName3>
            </u:actionName>
        </Target>

<Target value=" 123.156.213.3">
            <u:actionName mlns:u="urn:schemas-upnp-org:service:serviceType:v">
                <argumentName1>in arg value</argumentName1>                                    ~C
                <argumentName2>in arg value</argumentName2>
            </u:actionName>
        </Target>

<ResponseURL> http:// response.abc.com </ResponseURL>                                  ~D
    </s:Body>
</s:Envelope>
```

Table 1, "Notification Type" is a flag for indicating that a multicast message is a multicast control message including a control command, in order to discriminate the multicast message from a conventional multicast message.

Further, in Table 1, <argumentNameX> tag refers to the set of the control commands, which are to be applied to each RUIS device. That is, in Table 1, "A" is content corresponding to RUIS #1, <Target value="123.156.213.1"> indicates an IP address of RUIC #1, <argumentName1>in arg value</argumentName1> indicates that the number of control commands corresponding to RUIS #1 is one, and the control command is inserted to "in arg value".

Similarly, "B" is content corresponding to RUIS #2, <Target value="123.156.213.2"> indicates an IP address of RUIC #2, <argumentName1>in arg value</argumentName1><argumentName3>in arg value</argumentName3> indicate that the number of control commands corresponding to RUIS #2 is three, and the control commands are inserted to each "in arg value". "C" is content corresponding to RUIS #3, <Target FIGS. 5A and 5B are signal flow diagrams illustrating communication between an RUIC and adjacent RUISs according to an embodiment of the present invention.

Figure 5A:
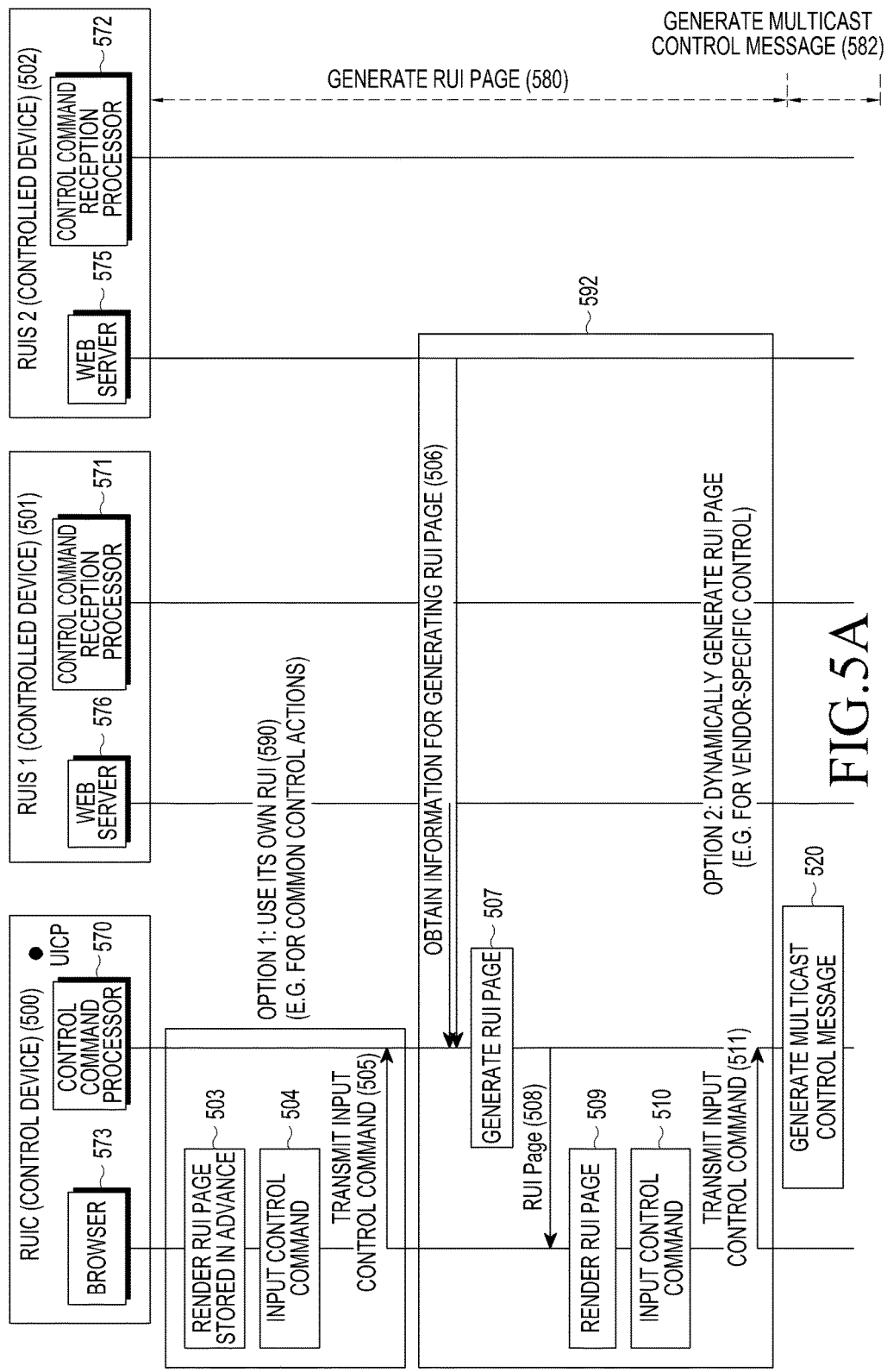
FIGS. 5A and 5B are signal flow diagrams illustrating communication between an RUIC and adjacent RUISs according to an embodiment of the present invention.
Figure 5B:
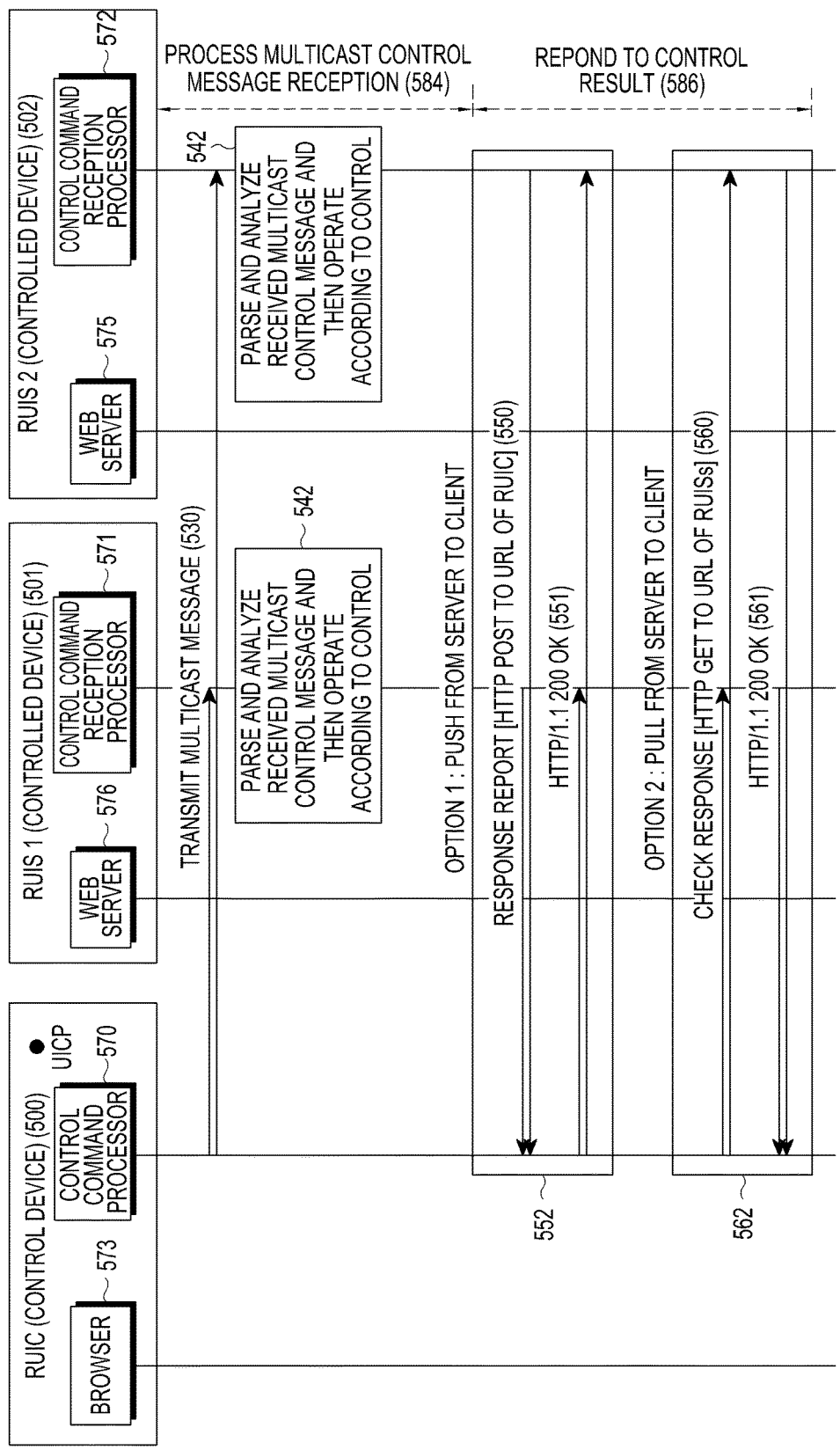

Referring to FIG. 5A, according to an embodiment of the present invention, an RUIC 500 provides an RUI page using either of two processes 590 and 592. The first process 590, i.e., Option 1, corresponds to a case in which the RUIC 500 stores the RUI page of RUISs 501 and 502 in advance. In process 590, although manufacturing companies of the RUIC 500 and RUISs 501 and 502 are different from each other, the RUIC 500 and the RUISs 501 and 502 can be controlled according to a common control command because they are all manufactured according to a specific standard.

The second process 92, i.e., Option 2, corresponds a case in which the RUIC 500 searches for the adjacent RUISs 501 and 502 and obtains information related to the control command that can control every RUIS, to control the RUI page controlling a corresponding RUIS. When the RUIC 500 and the RUIS 501 and 502 do not have a common standard and are specified according to each manufacturing company (vendor), Option 2 is used by the RUIC 500 to provide the RUI page for controlling each of the RUISs 501 and 502.

More specifically, in process 590, a browser 573 of the RUIC 500 renders the RUI page stored in advance to show the rendered RUI page to the user in step 503, and receives an input of the control command from the user in step 504. In step 505, the browser 573 transmits the input control command to a control command processor 570.

In process 592, after obtaining service lists, which can be provided in each RUIS, from web servers 575 and 576 of RUIS #1 501 and RUIS #2 502, which are the adjacent RUISs, and control information for controlling the RUISs in step 506, the control command processor 570 of the RUIC 500 generates the RUI page using the obtained information in step 507.

The control command processor 570 transmits the generated RUI page to the browser 573 in step 508, and the browser 573 renders the transmitted RUI page to show the rendered RUI page to the user in step 509.

The browser 573 receives an input of the control command in step 510 and transmits the input control command to the control command processor 570 in step 511.

When the RUI page is provided through either process 590 or process 592 and the control command for controlling the RUIS is input through the provided RUI page, the control command processor 570 determines the input control command and the RUIS list to be controlled and then generates the multicast control message in step 520. Subsequently, the control command processor 570 transmits the generated multicast control message to RUIS #1 501 and RUIS #2 502 in step 530, as illustrated in FIG. 5B.

Referring to FIG. 5B, the control command reception processors 571 and 572 of the RUISs 501 and 502 parse and analyze the received multicast control message in step 542. In step 542, the control command reception processors 571 and 572 perform operations according to the control command included in the analyzed multicast control message.

After performing the operations according to the control command in step 542, the control command reception processors 571 and 572 report a result to the RUIC 500 in step 552 or step 562. That is, there are two different schemes, i.e., step 552 and step 562, by which the control command reception processors 571 and 572 can report the operations according to the control command to the RUIC 500.

Step 552 is a method of transferring content of the received multicast control message to a URL (an address existing in the RUIC for reporting the operation according to the control command) included in the multicast control message by using an HTTP POST command. Step 562 is a process in which the control command processor 570 makes a request for a current state of a control result to a URL address included in each of the RUISs 501 and 502 in which information through which states of the RUISs 501 and 502 obtained in step 506 can be recognized is stored by using an HTTP GET command, in a polling manner.

More specifically, in step 550, the control command processors 571 and 572 transmit a response to the control command to the URL, which exists in the RUIC 500, included in the multicast control message received in step 530 by using the HTTP POST command. In step 551, the control command processor 570 transmits an HTTP response message to each of the control command reception processors 571 and 572 in response to step 550. Therefore, the control command processor 570 requires a kind of small, embedded web server function, which can receive, and process the HTTP request.

Alternatively, in step 560, the control command processor 570 brings a processing result of the control command to the URL address included in state information of the RUISs 501 and 502 obtained in step 506 by using the HTTP GET command. In step 561, the control command reception processors 571 and 572 transmit an HTTP response message to the control command processor 570 in response to step 560. Through the report in step 561, the control command processor 570 can recognize whether the control operations of RUIS #1 501 and RUIS #2 502 are successfully performed. However, when the control operations fail, the control command processor 570 performs an operation for identifying the reason of the failure.

Referring to FIGS. 5A and 5B, the above described method can be largely divided into step 580 for providing the RUI page, step 582 for generating the multicast control message, step 584 for processing the multicast control message reception, and step 586 for responding to the control result as described above.

Additionally, in the aforementioned descriptions of FIGS. 5A and 5B, it is assumed that the UICP is located in the RUIC 500 for convenience of the description. However, the UICP can be located in the RUISs 501 or 502 or in separate device. Basically, the UICP can uniformly operate no matter where the location.

Figure 6:
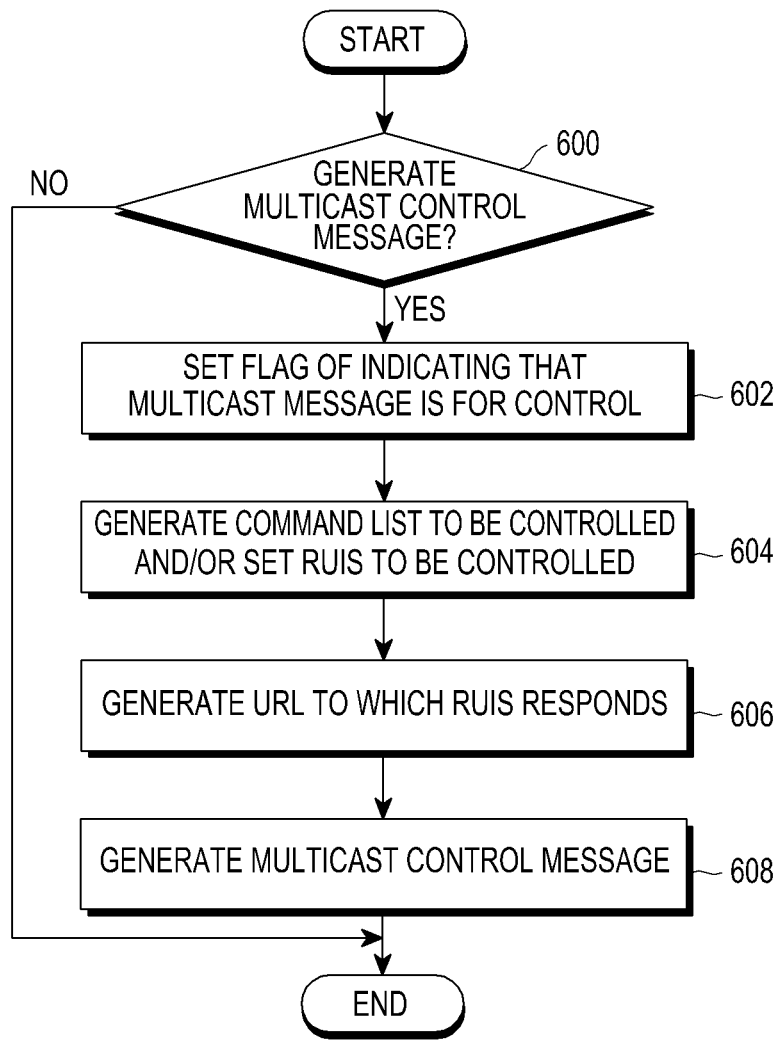
FIG. 6 is a flowchart illustrating a method of generating a multicast control message by an RUIC according to an embodiment of the present invention.

FIG. 6 is a flowchart illustrating a method of generating a multicast control message by an RUIC according to an embodiment of the present invention.

Referring to FIG. 6, in step 600, the control command processor 570 of the RUIC determines whether the control command processor 570 will generate the multicast control message. When the control command processor 570 determines to generate the multicast control message, the control command processor 570 sets a flag for indicating that the multicast control message is for the control within the multicast control message.

In step 604, the control command processor 570 of the RUIC generates the control command list and sets the RUISs, which the control command processor 570 will control. In step 604, when there are several commands to be controlled, the control command processor 570 generates lists of the commands to be controlled and determines a processing order of the control commands included in the generated lists so that the control command processor 570 can set a priority for which control message should be controlled first. Further, when it is required to select the RUISs to be controlled among the RUISs existing on a home network in step 604, the control command processor 570 sets the RUISs to be controlled and generates lists of the RUISs to be controlled.

The control command processor 570 generates a URL to which the RUIS responds in step 606, and in step 608, generates the multicast control message including information generated in step 602 to step 606.

Figure 7:
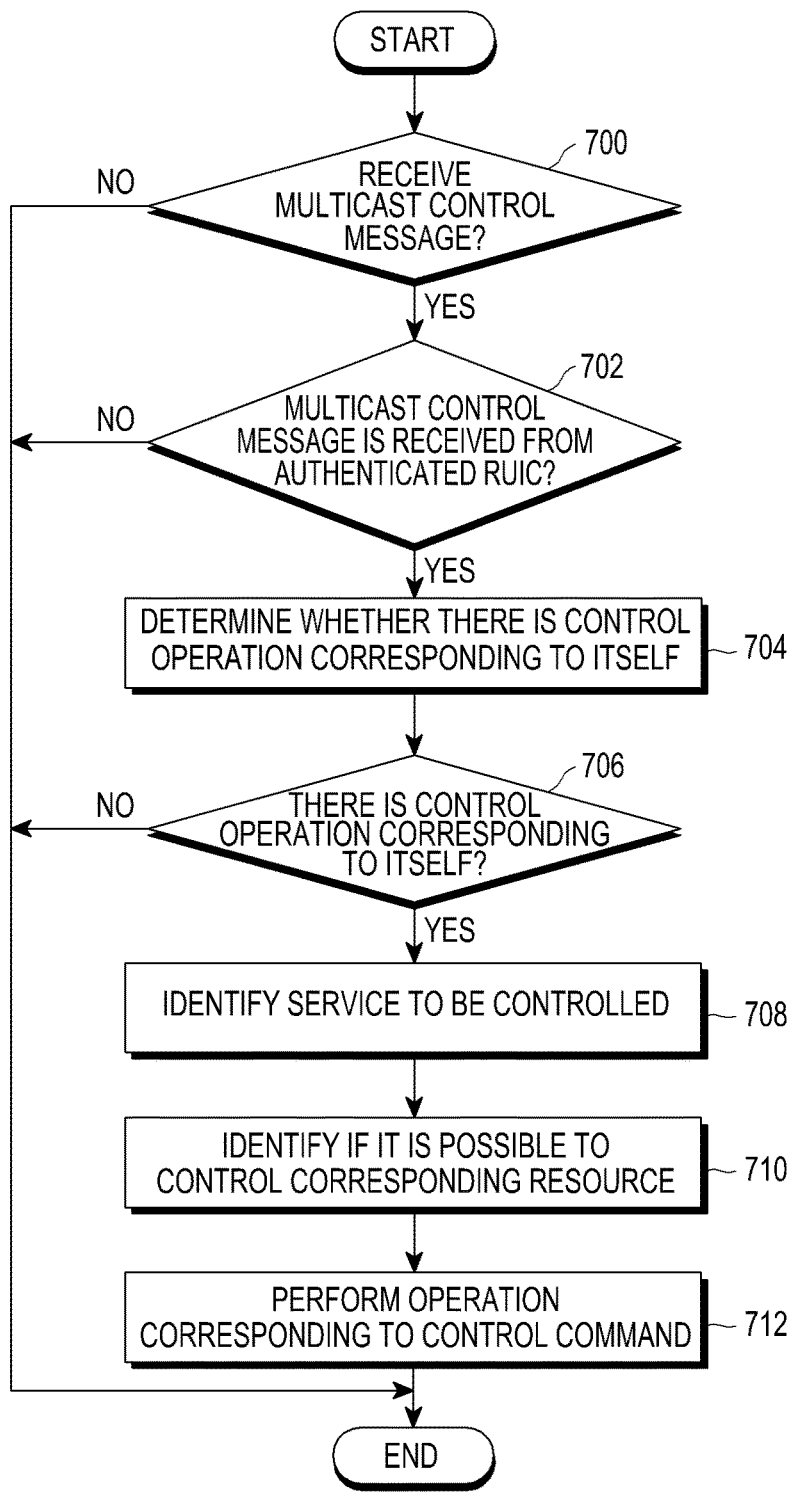
FIG. 7 is a flowchart illustrating a method of parsing a multicast control message received by a control command reception processor of an RUIS according to an embodiment of the present invention.

FIG. 7 is a flowchart illustrating a method of parsing a multicast control message received by a control command reception processor of an RUIS according to an embodiment of the present invention.

Referring to FIG. 7, when the control command reception processors 571 and 572 receive the multicast control message in step 700, the control command reception processors 571 and 572 identify whether the received multicast control message is a multicast control message received from an authenticated RUIC in step 702. Here, various know authentication methods may be used as an authentication method.

When the received multicast control message is the multicast control message received from the authenticated RUIC, the control command reception processors 571 and 572 determine whether the received multicast control message includes control commands corresponding to the control command reception processors 571 and 572 themselves in step 704. When the control commands are confirmed to correspond to the control command reception processors 571 and 572 in step 706, the control command reception processors 571 and 572 identify a service to be controlled according to the control commands in step 708 and identify whether it is possible to control the service resource to be controlled in step 710.

For example, when the control command is a command for turning down the volume, if someone has already controlled the volume, it is determined that the control command for turning down the volume is not possible in step 710.

In step 712, control command reception processors 571 and 572 perform operations for the control command.

According to the above-described embodiments of the present invention, it is possible to efficiently control a plurality of RUIS devices by effectively transmitting a plurality of control commands to the plurality of RUIS devices in a remote UI environment. Therefore, through the implementation of the present invention, it is not necessary that an RUIC repeatedly transmits a control command of the same context for controlling the same operation to unspecified and varying devices. Further, even when the RUIC cannot exactly recognize or it is cumbersome to recognize the kind and number of adjacent RUIS devices to be controlled, the RUIC can still control the RUIS devices.

While the present invention has been shown and described with reference to certain embodiments and drawings thereof, it will be understood by those skilled in the art that various changes in form and details may be made therein without departing from the spirit and scope of the invention as defined by the appended claims.

What is claimed is:

1. A method for controlling a plurality of controlled devices by a controlling device in a home network, the method comprising:
   displaying a user interface (UI) page for controlling the plurality of controlled devices;
   receiving an input of control commands for controlling the plurality of controlled devices from a user through the UI page;
   generating a control message for transmitting the control commands, the control message including a first part for controlling a function of the plurality of controlled devices and a second part for controlling an additional function for at least one of the plurality of controlled devices; and
   transmitting the control message to the plurality of controlled devices.

2. The method of claim 1, wherein the control message further includes at least one of flag information indicating that the control message includes control commands and a uniform resource location (URL) to which the plurality of controlled devices having performed a control command included in the control message will respond.

3. The method of claim 1, wherein the plurality of controlled devices are unspecific to the controlling device.

4. The method of claim 1, further comprising:
   obtaining information for generating the UI page from the plurality of controlled devices; and
   generating the UI page using the information obtained from the plurality of controlled devices.

5. The method of claim 1, wherein the first part is configured to control the plurality of controlled devices to turn on.

6. A controlling device for controlling a plurality of controlled devices in a home network, the controlling device comprising:
   a display for displaying a user interface (UI) page for controlling the plurality of controlled devices;
   an interface unit configured to receive an input of control commands for controlling the plurality of controlled devices from a user through the UI page;
   a controller configured to generate a control message for transmitting the control commands, the control message including a first part for controlling a function of the plurality of controlled devices and a second part for controlling an additional function for at least one of the plurality of controlled devices; and
   a transceiver configured to transmit the control message to the plurality of controlled devices.

7. The controlling device of claim 6, wherein the control message further includes at least one of flag information indicating that the control message includes control commands and a uniform resource location (URL) to which the plurality of controlled devices having performed a control command included in the control message will respond.

8. The controlling device of claim 6, wherein the plurality of controlled devices are unspecific to the controlling device.

9. The controlling device of claim 6, wherein the transceiver receives information for generating the UI page from the plurality of controlled devices, and
   wherein the controller generates the UI page using the information obtained from the plurality of controlled devices.

10. The controlling device of claim 6, wherein the first part is configured to control the plurality of controlled devices to turn on.

11. A method for receiving control commands from a controlling device by a controlled device, the method comprising:
    receiving a control message from the controlling device, the control message including a first part for controlling a function of a plurality of controlled devices and a second part for controlling an additional function for at least one of the plurality of controlled devices; and
    performing an operation corresponding to a control command by identifying whether there is a service to be controlled by the controlling device according to the control commands included in the control message.

12. The method of claim 11, wherein the control message further includes at least one of flag information indicating that the control message includes control commands and a uniform resource location (URL) to which the plurality of controlled devices having performed a control command included in the control message will respond.

13. The method of claim 11, further comprising transmitting a performance result of the control command or commands performed by the controlled device to the controlling device in response to the control message.

14. The method of claim 11, wherein the first part is configured to control the plurality of controlled devices to turn on.

15. A controlled device for receiving control commands from a controlling device, the controlled device comprising:
- a transceiver configured to receive a control message from the controlling device, the control message including a first part for controlling a function of a plurality of controlled devices and a second part for controlling an additional function for at least one of the plurality of controlled devices; and
- a controller for performing an operation corresponding to a control command by identifying whether there is a service to be controlled by the controlling device according to the control commands included in the control message.

16. The controlled device of claim 15, wherein the control message further includes at least one of flag information indicating that the control message includes control commands and a uniform resource location (URL) to which the plurality of controlled devices having performed a control command included in the control message will respond.

17. The controlled device of claim 15, further comprising transmitting a performance result of the control command or commands performed by the controlled device to the controlling device in response to the control message.

18. The controlled device of claim 15, wherein the first part is configured to control the plurality of controlled devices to turn on.

* * * * *